May 4, 1943.　　　P. R. HORNBROOK　　　2,318,395
CONVEYING APPARATUS
Filed Aug. 3, 1940　　　4 Sheets-Sheet 1

INVENTOR
Philip R. Hornbrook
BY
ATTORNEYS

May 4, 1943.　　　P. R. HORNBROOK　　　2,318,395
CONVEYING APPARATUS
Filed Aug. 3, 1940　　　4 Sheets-Sheet 2

May 4, 1943. P. R. HORNBROOK 2,318,395
CONVEYING APPARATUS
Filed Aug. 3, 1940 4 Sheets-Sheet 3
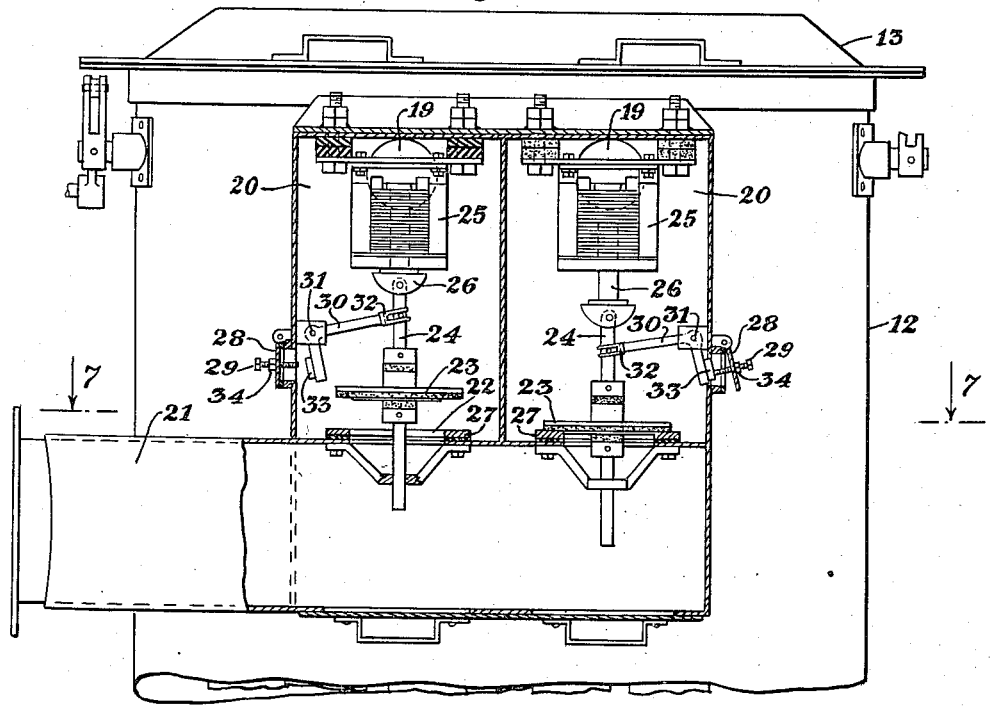
Fig. 6,
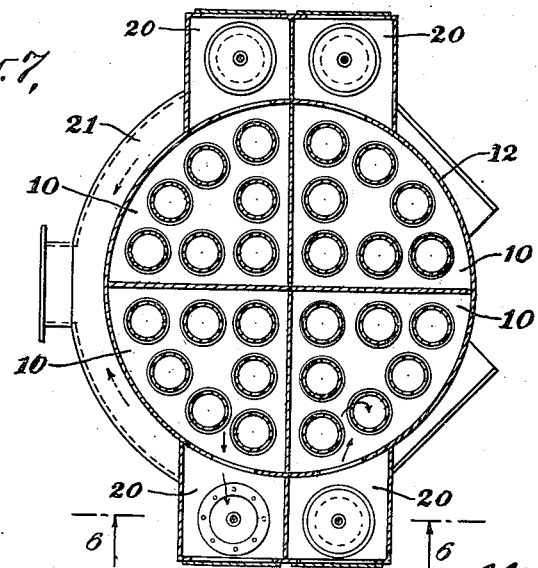
Fig. 7,
INVENTOR
Philip R. Hornbrook
BY
ATTORNEYS

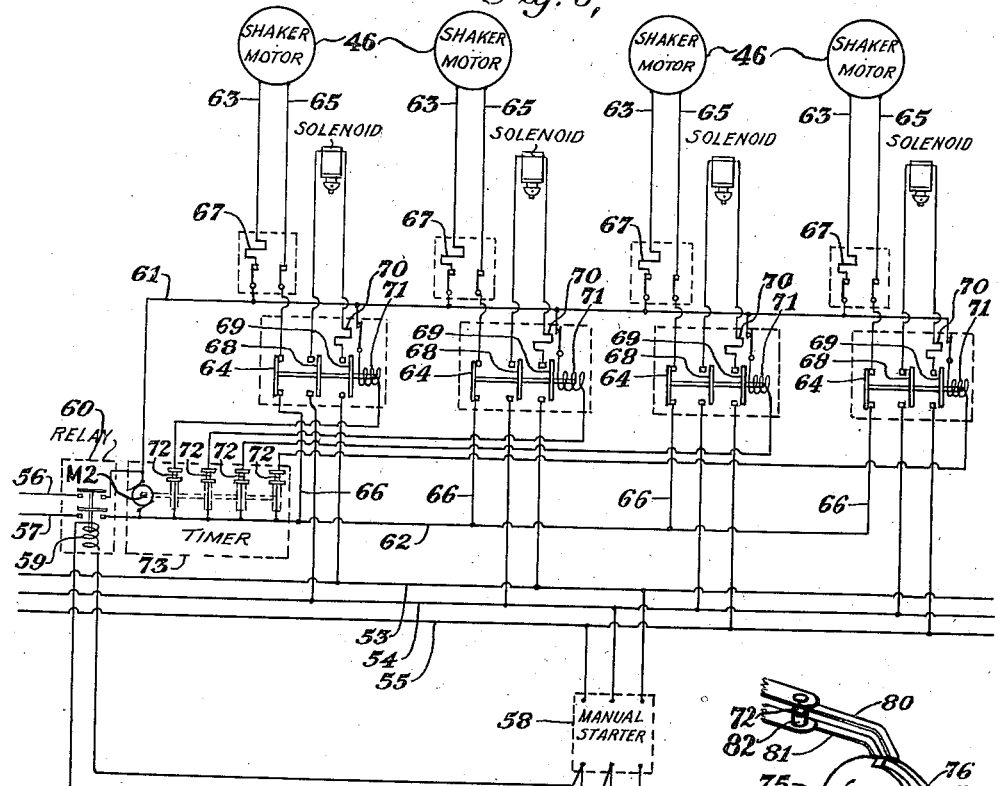
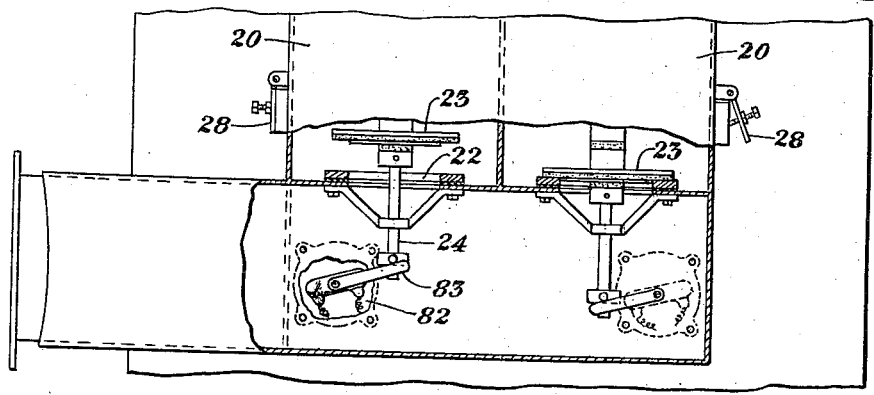

Patented May 4, 1943

2,318,395

UNITED STATES PATENT OFFICE 2,318,395

CONVEYING APPARATUS

Philip R. Hornbrook, Allentown, Pa., assignor to Fuller Company, Catasauqua, Pa., a corporation of Delaware Application August 3, 1940, Serial No. 350,961

10 Claims. (Cl. 183—53)

This invention relates to apparatuses for separating entrained solid particles from air or the like which include filtering units connected at one end to a manifold to which the medium to be filtered is delivered, and at the other end to a manifold to which is connected an exhaust means for drawing the medium to be filtered through filter bags provided in each unit. More particularly the invention is concerned with novel means for cleaning the filter bags in the filtering units at selected intervals and for a predetermined length of time.

In apparatuses of this type, the filtering members consisting usually of closely woven fabric in the form of a tube, open at one end, receive the medium to be filtered in the open end of the tube from the inlet manifold. The medium introduced into the tubes travels through the walls of the tubes, but the entrained particles are refused passage therethrough and are deposited upon the inner walls, and soon fill the interstices of the fabric and gradually builds up a layer of material. This deposited material impedes the passage of the gas, resulting in a substantial loss of efficiency of the separator. In order that the separating operation may be continuous it is customary to clean the units one at a time at separated intervals, at which time the flow of air or other gas through the tubes undergoing cleaning is reversed by disconnecting the unit from the exhaust and opening it to the atmosphere. At the time of air reversal the tubes are shaken by suitable means thus causing the deposited material to fall from the open end. Although various means have been employed heretofore for the cleaning of the tubes in a manner just described those expedients have not proved wholly satisfactory. The problem presented is that of obtaining complete removal of the deposited material upon the walls of the filtering members at desired intervals by means which will be unfailing in its action, and at the same time will not subject the various parts to any considerable wear. A further problem presented is that of varying the cleaning frequency, found necessary, for the filtering of gases entraining materials of different characteristics or volumes, or materials differing both in characteristics and volume, while at the same time maintaining the desired length of each cleaning period by means which will not require the disassembly or stopping of the mechanism.

In one prior construction pneumatic means are utilized for the cleaning operation and comprises an air operated valve to reverse the flow of air in the unit undergoing treatment, and an air operated motor for shaking the filtering members. Each filtering unit is provided with such a valve and motor, and a rotary distributor controls the source of air supply. Upon each revolution of the distributor arm the lines leading to the valve and motor of the various units are connected to the compressed air supply for a certain period. This type of cleaning means has a number of distinct disadvantages. The harsh snap or better termed banging action of the valve and motor in this type of construction is not only destructive upon these parts, necessitating frequent replacement, but due to the rough treratment to which the motor subjects the tube members their life is materially reduced. Another and more serious disadvantage of the pneumatic motor is its inability to adapt itself to operating changes. Motors of this type include a piston which operates against spring tension, and these springs are set for a given line pressure from the source of supply. It is difficult to maintain this line pressure constant and consequently the operation of the motor is erratic and should the pressure drop slightly for any period, operation completely stops. Adding to the difficulty of balancing the spring pressure and the air line pressure is the change of relationship between the spring and air line pressures caused by the building up of the material upon the bags during operation of the separator, such additional weight which is supported upon the springs gradually changing the relationship and throwing the motor out of balance. Operation of the motor for any considerable time has the same effect of changing the spring and air pressure relationship, as the spring strength is reduced gradually by a fatigue of the metal. A still further disadvantage of this prior construction, and of all prior construction found in the art, is the lack of adjustability for separating materials having different characteristics. When the character of the entrained material or the volume of material entrained requires that the filtering members be cleaned more frequently the rotary distributor of the prior construction may be speeded up to increase the cleaning frequency, but the mere increase in frequency will not give economical operation as the duration of the cleaning operation is shortened in direct proportion to the change in frequency. In order to maintain the proper cleaning period when increased cleaning frequency is required the rotary air distributor must be disassembled and the distributor replaced with one designed to give the new relationship. Such change disrupts the operation of the separator with the consequent loss in efficiency, cost of replacement parts, and labor to make the changes.

The present invention is, accordingly, directed to the provision of cleaning means for the bag filters of apparatuses for separating entrained solid particles from air or the like which not only effectively cleans the bags at selected time intervals for selected cleaning periods, but is also so constructed as to have long life, positive yet gentle action upon the bags, insuring long life to those parts, and be capable of operation for long periods without attention or replacement of parts.

In general the cleaning mechanism of the invention comprises a valve chamber for each of the several filtering units through which the air after passing through the filtering members passes to a common exhaust manifold. A valve in the exhaust chamber controls the passage of air therethrough, this valve being operated by a solenoid or the like to which the stem of the valve is connected. Upon energization of the solenoid the valve is raised from its seat and air is permitted to flow through the filters of the particular unit. When the operating means of the valve such as the solenoid is deenergized the valve falls by gravity and disconnects the unit from the common manifold and the exhauster. It is essential that a reverse flow of air take place through the filtering members at the time of cleaning in order to dislodge the particles which have become forced into the interstices of the cloth of which the filters are constructed and for this purpose an atmospheric inlet valve is provided in the valve chamber. This valve is closed during the filtering operation, at which time the exhaust valve is open, and is moved to open position by an operating arm connected to the stem of the exhaust valve, thus closing of the exhaust valve and the opening of the atmospheric inlet valve is instantaneous, and causes no disturbance to the partial vacuum maintained by the exhauster in the common manifold.

In order to insure complete removal of all the deposited particles the filter members undergo a positive but gentle shaking or better termed a mild snapping of the cloth of the filter. For this purpose the filter members of each unit are attached at their closed or upper end to a ridged frame which is spring supported to hold the filter members just short of a taut condition, and a shaft, connected by suitable arms to the frame and oscillated by a small electric motor through suitable cam connections, causes the frame to move up and down whereby the filter members are permitted to relax or sag and return to their original position upon each oscillation of the shaft. However the connection from the shaft to the frame is so constructed as not to pull the bags beyond their original position of slight looseness thereby avoiding any undue wear upon these members.

Operation of the shaker motor is made dependent upon operation of the exhaust valve thus insuring the operation of this member at the proper time.

In one form, the power line to the shaker motor is completed by a contact carried by the switch controlling energization of the solenoid or other means which operates the exhaust valve. In operation when the supply of power to the operating means for operation of the exhaust valve is broken the line to the shaker motor is made, thus causing the two to operate instantaneously.

In another form, a mercoid switch which is normally open controls the power to the shaker motor. This mercoid switch is operated to complete the circuit to the motor by an extension of the exhaust valve when it falls by gravity to the closed position.

The frequency of the energization and deenergization of the exhaust valve operating means upon which the entire cleaning operation is dependent is controlled by a motor operated timer of a well known type. By the use of this type of timer the frequency of cleaning periods may be varied at will by a change in the gear ratio between the motor and a rotary shaft carrying contact operating discs. Also by the use of this type of timer the contact period controlling the energization of the solenoid may be varied, thus the cleaning period may be that desired regardless of the frequency of cleaning period.

Fig. 6 is a detailed sectional view taken on line 6—6 of Fig. 7.

Fig. 7 is a a detailed sectional view taken on line 7—7 of Fig. 6.

Fig. 8 is a schematic wiring diagram showing the electrical connection for one form of the apparatus.

Fig. 9 is a partial elevation partially in section showing a modification of the shaker control.

Fig. 10 is a detail view of a pair of the control discs.

Figure 1:
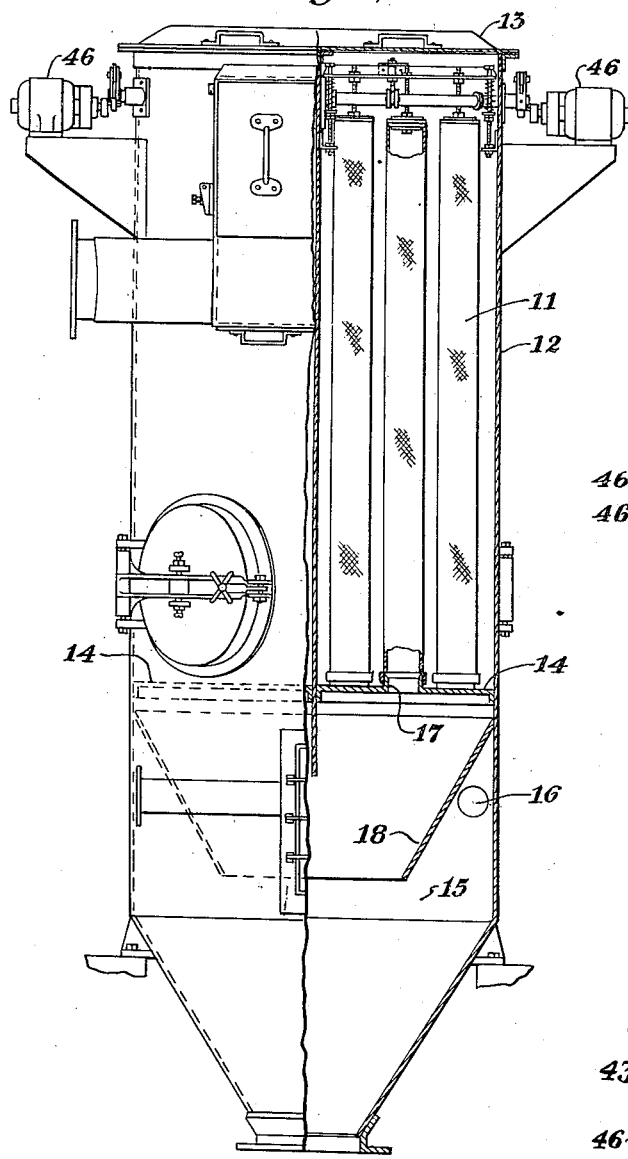
Fig. 1 is an elevation of a dust collector embodying the invention with parts broken away to show the interior of one of the compartments.
Figure 2:
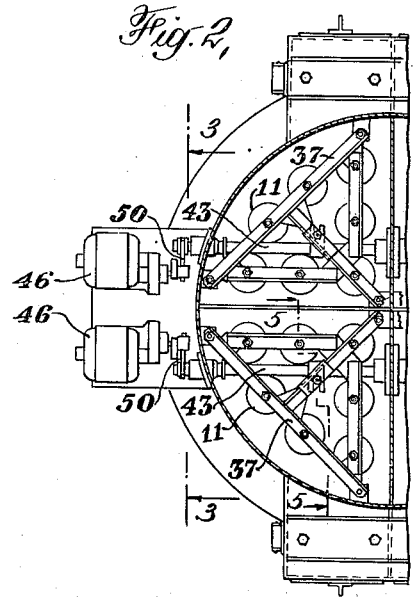
Fig. 2 is a partial top plan view of the apparatus with the cover plate removed.
Figure 3:
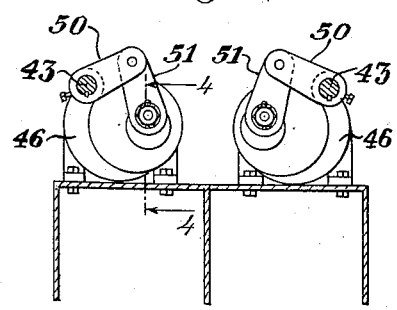
Fig. 3 is a section view taken on lines 3—3 of Fig. 2.
Figure 4:
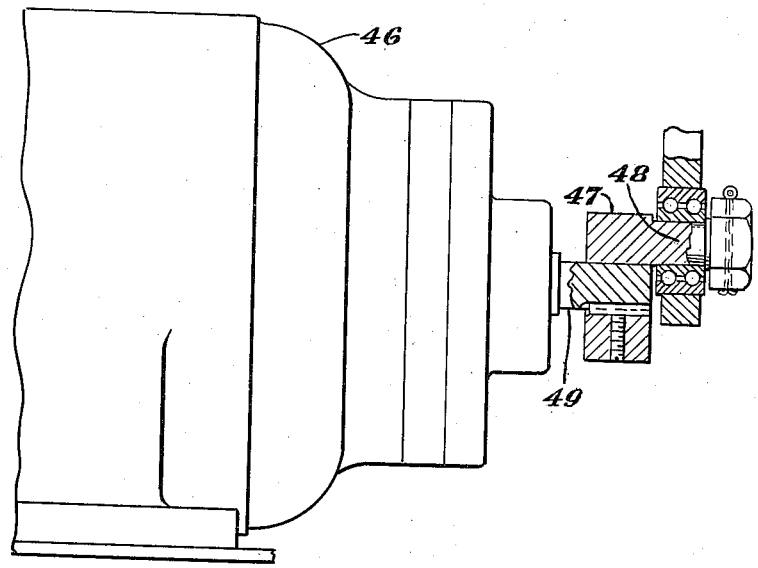
Fig. 4 is a section view taken on lines 4—4 of Fig. 3.
Figure 5:
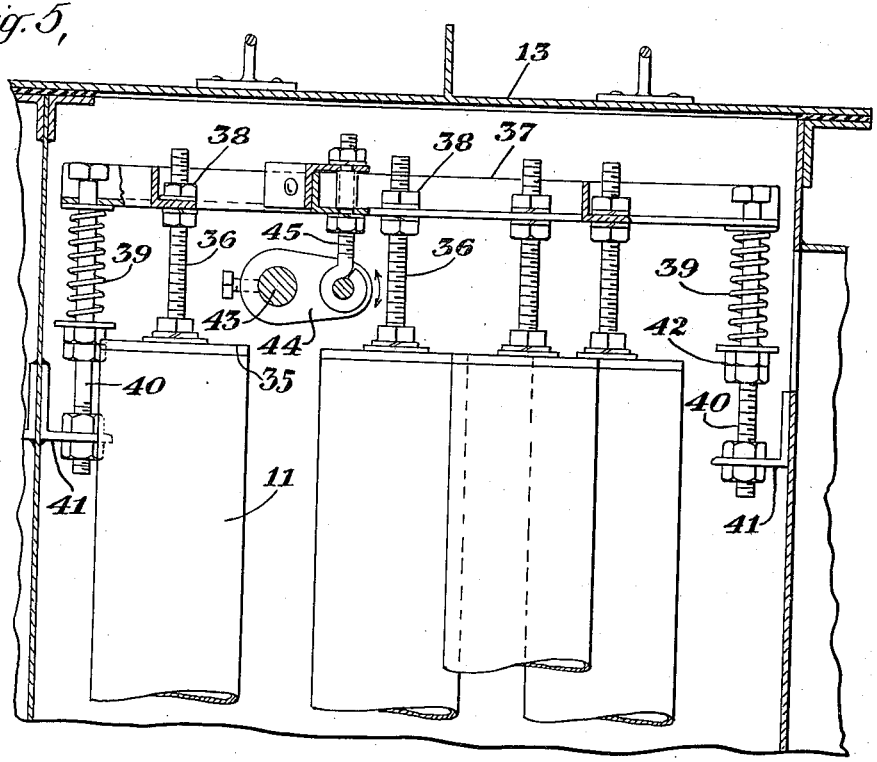
Fig. 5 is a detailed sectional view taken on lines 5—5 of Fig. 2.

Referring to the drawings, the separator illustrated includes four filtering compartments 10, in each of which are positioned a plurality of filtering members 11 which may be of the bag type, constructed of foraminous material, and through which the air or gas to be filtered passes during the filtering operation (hereinafter the filtering medium will be designated as air for convenience). The four compartments are included in a common casing 12, closed at their upper end by a cover plate 13 and at their lower end by division plates 14 which separate the compartments from a common discharge hopper 15 positioned in the lower portion of the casing. The filter bags are closed at their upper end and are suspended in each compartment for shaking movement, the lower end of the filter bags being attached to flanges 17 defining openings in the division plates. The air to be filtered enters the upper portion of the discharge hopper 15 through opening 16 positioned in a manner to direct the incoming air stream to the hopper in a tangential manner whereby the heavier particles carried in the air stream are thrown out, and a baffle plate 18 further assists in the removal of the heavier particles by causing the air to be filtered to reverse its direction of flow prior to its entry into the filter members through opening 17.

The cleaned air passes from the upper ends of the filtering compartments through openings 19 to individual valve chambers 20 provided for each filtering compartment, each valve chamber being connected to an exhaust manifold 21, through an opening 22, the exhaust manifold being common to the several compartments, and through which the air is drawn by suitable suction means (not shown). A valve 23 having a stem 24 which extends above and below the valve is provided in each valve chamber and operates normally to close the opening 22 and disconnect the filtering compartments from the common exhaust manifold. Operation of the valve to open position is controlled by a solenoid 25 provided in each valve chamber, the operating core 26 of the solenoid 25 being attached to the upper portion of the valve stem, thus upon energization of the operating coil of the solenoid the valve is raised from its seat 27 to connect the compartments to a common exhaust manifold.

A second valve 28 is provided in each valve chamber to connect the compartments to atmosphere and reverse the flow of air through the filter members when the compartment is cut off from the exhaust manifold for cleaning purposes. Operation of this valve is controlled by the movement of the valve 23 to closed position through a bell crank 30, pivoted at 31 to a suitable support on the inner wall of the valve chamber, and having one arm 32 pinned to the stem 24. The other arm of the bell crank carries a contact member 33 which upon rotation of the bell crank caused by the downward movement of the valve 23 contacts an operating pin 29 of the second valve to move the valve to its open position. The degree to which the second valve 28 is opened upon closure of the valve 23 may be varied by adjusting the length of the operating pin 29 through suitable nuts 34, the variation of this degree of opening being necessary for the proper handling of materials of different characteristics.

Although the reversal of air through the bags of a unit undergoing cleaning is sufficient to remove a large portion of the deposited material, it is found desirable to shake the bags at times of air reversal, and for this purpose the bags 11 of each compartment are closed at their upper ends by discs 35, to which are attached bolts 33 adapted to be secured by an adjustable fastening means 38 to a rigid frame 37 provided in each filtering unit. The frames 37 are supported upon springs 39 carried on pins 40 which are in turn supported by angles 41 fast to the inner walls of the compartments, the elevation of the frames on the pin being adjustable through nuts 42 in order to properly position the frames. During the period of air reversal the frames are caused to reciprocate gently by oscillating shaft 43 connected to the frame through rocker arm 44 and eyebolts 45. The elevation of the frames are adjusted through adjustable springs 39, and the relationship of the bags relative to the frames are adjusted through adjustable fastening means 38 in a manner so that upon reciprocation of the frames the maximum extension to which the bags are subjected is just short of a taut condition, thereby insuring long life to these members.

A motor 46 is provided for each filtering compartment and controls the oscillation of the shaft 43. A crank disc 47 having a crank pin 48 is mounted upon the rotor shaft 49 of the motor and transmits its movement to the shaft 43 through connecting rod 50 and rocker arm 51. From this construction it will be seen that when power is supplied to the motor 46 the bags will be gently yet positively shaken, thus further insuring long life to the bags.

In order to maintain continuous operation of the separator, the bags of the several filtering units are cleaned in a predetermined sequence, and although it is theoretically possible to maintain continuous operation with at least one filtering unit operating, it has been found from actual practice with devices of the type illustrated having four filtering compartments that only one of the compartments at a time should be disconnected from the exhaust manifold and the air reversed therethrough. The effect of having the remainder of the units in operation not only insures the continuous performance of the seperator, but due to the communication of the several compartments to the common discharge hopper 15 air entering the atmospheric valve 28 is caused to flow through the bags in a reversed direction.

The power and control circuits for the solenoids controlling the operation of the air reversal valves and the shaker motors of the several compartments is shown schematically in Fig. 8. The power lines for the filter motor M1 are represented by lines 53, 54 and 55 and the power lines for the shaker motors and magnetic starters are represented by lines 56 and 57. A manually operated switch 58 in its closed position connects the filter motor to power lines 53, 54 and 55 whereupon suction means (not shown) creates a partial vacuum in the common manifold to draw the air through the filters, this switch 58 also completing the circuit to the operating coil 59 of a normally open interlocking relay 60 to close the relay and complete the circuit to line 61 and 62 from which the shaker motors derive their power.

The shaker motors 46 have one lead 63 permanently connected to power line 61, and normally closed contacts 64 connect the other leads 65 of these motors to power line 62 through a short wire 66 to complete the circuit. An overload relay 67 is included in each of the motor circuits. Normally open sets of contacts 68 and 69 carried by the same operating arm as each contact 64 are adapted to complete the circuits through the solenoids to the power lines 53, 54, and 55, these circuits including overload relays 70. An operating coil 71 controls the position of each set of contacts 64, 68 and 69 and upon energization of the coil, contact 64 of the particular set moves to open position to disconnect the shaker motor from the power source and simultaneously contacts 68 and 69 of the set move to their closed position to connect the solenoid to a source of power. The coils 71 are connected at one end to power line 61, and the other ends of these coils are connected to separate contacts 72 which complete the circuit through the coils through a timer mechanism denoted generally at 73.

The timer is of a well-known type having a motor M2, suitably connected to power lines 61 and 62, which through suitable gears drives a shaft 74 upon which is mounted pairs of discs 75 and 76, the discs having cutout portions which control the opening and closing of contacts 72. Particular reference is directed to Fig. 10 wherein an enlarged view of one pair of the control discs 75 and 76 is shown together with its correspondingly controlled contact, it being understood that a pair of these discs is provided for each unit. Discs 75 and 76 have cutout portions 77 and 78 extending approximately 90° about their respective peripheries, and the relative position of these cutout portions may be adjusted by loosening clamping nut 79 and turning the disc on the shaft by hand. When it is desired to change the relative position of the discs upon the shaft it is not necessary to halt the operation of the separator as the change may be made quickly at a time when all of the units are in a filtering period. Fingers 80 carry the contacts 72 and ride upon the periphery of discs 76 and fingers 81 carry cooperating contacts 82 suitably connected to the power line 62 and ride upon discs 75. Upon rotation of the pair of discs by the motor M2 in a counterclockwise manner, the contacts of the several units are closed when the fingers ride upon the normal periphery of the discs, but when a finger 81 reaches the cutout portion of its control disc, it suddenly drops and breaks the contact which continues to be broken until its cooperating finger 80 reaches the cutout portion of its control disc 76, whereupon, it also drops to again close the contact. As the discs continue to rotate, finger 81 rises to the normal periphery carrying finger 80 therewith, and thus holds it until the normal periphery of disc 76 is reached.

The pairs of discs are so positioned on the shaft that the circuits to the several coils 71 are broken at desired time intervals and in a predetermined sequence. The frequency of the energization of the coils 71 may be varied by simply changing the gear ratio between the motor M2 and the shaft 74, for any new speed of rotation, of the shaft 74, a corresponding adjustment may be made in the relative position of the cutout portions of each pair of discs in order to maintain the desired length of the cleaning period.

In a modified form of the device shown in Fig. 9, a mercoid switch 84 which is normally open controls the circuit to the shaker motor of each compartment. Valve stem 24 in its released position contacts an arm 83 of the mercoid switch to rotate this member to complete the circuit to the shaker motor, thus the shaker motor operates only when the compartment is cut off from the exhaust manifold. The operation of the air reversal valves and the timer mechanism is the same in this type of device as that previously described except of course the contact for the shaker motor has been eliminated, and it is therefore not believed necessary to repeat the explanation of these controls.

The cleaning mechanism of the invention has proven highly satisfactory in practice and has demonstrated its vast superiority over that now used for this purpose. The cleaning operation of each filtering unit is assured at the predetermined intervals, the cleaning operation being performed in a manner which is not destructive to the several working parts, thus the device may be left unattended for long periods.

I claim:

1. In an apparatus for separating finely entrained material from air or the like, including a plurality of filtering units connected at one end to a common source of the medium to be filtered and at the other end to a common exhaust manifold, each filtering unit having filter bags supported therein for shaking movement, the improvement in means for cleaning the filter members of each filtering unit comprising a valve to close the connection between the filtering unit and the exhaust manifold, means for actuating the valve including a solenoid and switch means for controlling the connection of the solenoid to its source of power, a second valve to open the filtering unit to atmosphere, means responsive to movement of the first named valve to closed position to open the second valve and cause a reversal of air through the filter bags, means for shaking the filter bags including a motor, switch means controlling the connection of the shaker motor to its source of power, and means mechanically connected to a portion of the actuating means for the first-named valve for causing the switch for the shaker motor to be closed when the solenoid is operated to close the first named valve.

2. In an apparatus for separating entrained material from air or the like, including a plurality of filtering units connected at one end to a common source of the medium to be filtered and at the other end to a common exhaust manifold, each filtering unit having filter bags supported therein for shaking movement, the improvement in means for cleaning the filter members of each unit comprising a valve controlling passage of filtered air through the unit, means for actuating the valve including a solenoid and magnetically operated contactors controlling the source of power to the solenoid, means for shaking the filter members including a motor and magnetically operated contactors controlling the source of power to the shaker motor, and means mechanically connected to a portion of the actuating means for the first-named valve and causing the magnetic contactors for the shaker motor to be closed when the solenoid is operated to cause the valve to disconnect the filtering unit from the common manifold.

3. In an apparatus for separating entrained material from air including a plurality of filtering units having filters supported for shaking movement therein, the units being connected at one end to a common source of air to be filtered and at the other end to a common exhaust manifold, the improvement in means for cleaning the filtering members of each unit which comprises a valve controlling passage of filtered air through the filter members, a solenoid controlling operation of the valve, a second valve to connect the filtering unit to atmosphere, a pin carried by the second valve, means operable upon closure of the first named valve to contact the pin and open the second valve and means to adjust the length of the pin to vary the degree of opening of the second valve.

4. In an apparatus for separating entrained material from air including a plurality of filtering units having filters supported for shaking movement therein, the units being connected at one end to a common source of air to be filtered and at the other end to a common exhaust manifold, the improvement in means for cleaning the filtering members of each unit which comprises a valve controlling passage of filtered air through the filter members, a solenoid controlling operation of the valve, a second valve, adapted when open to connect the filtering unit to atmosphere, means responsive to closing of the first named valve to open said second valve to cause a reversal of air through the filters, means to shake the filters during the period of air reversal, a switch controlling operation of the shaking means, and means carried by the first named valve to move the switch to its closed position when the first named valve is positioned to halt the flow of air through the filters.

5. In an apparatus for separating entrained material from air including a plurality of filtering units having filters supported for shaking movement therein, the units being connected at one end to a common source of air to be filtered and at the other end to a common exhaust manifold, the improvement in means for cleaning the filtering members of each unit which comprises a valve controlling passage of filtered air through the filter members, a solenoid controlling operation of the valve, a second valve, adapted when open to connect the unit to atmosphere, means responsive to closing of the first named valve to open said second valve to cause a reversal of air through the filters, means to shake the filters including a motor, a mercoid switch adapted in one position to connect the motor to a source of power, and a stem carried by the first named valve to operate the mercoid switch.

6. In an apparatus for separating entrained material from air including a plurality of filtering units having filters therein supported for shaking movement, the units being connected at one end to a common source of air to be filtered and at the other end to a common exhaust manifold, the improvement in means for periodically cleaning the filters of the several units which comprises, a valve for each filtering unit to selectively disconnect the unit from the common manifold, a solenoid for each valve controlling the operation thereof, a second valve for each unit to connect the unit to atmosphere, means responsive to movement of the solenoid operated valve to its closed position to open the second valve, filter shaking means for each filtering unit including a motor, switch means in the power circuits of the shaker motor and solenoid of each filtering unit to complete said circuits in a manner to operate the shaker motor only when the solenoid is operated to disconnect the unit from the common exhaust manifold, and a timer controlling operation of the switch means of the several filtering units in a predetermined sequence.

7. In an apparatus for separating entrained material from air including a plurality of filtering units having filters therein supported for shaking movement, the units being connected at one end to a common source of air to be filtered and at the other end to a common exhaust manifold, the improvement in means for periodically cleaning the filters of the several units which comprises a valve for each filtering unit to selectively disconnect the unit from the common manifold, a solenoid for each valve controlling the operation thereof, a second valve for each unit to connect the unit to atmosphere, means responsive to movement of the solenoid operated valve to its closed position to open the second valve, filter shaking means for each filtering unit including a motor, switch means in the power circuits of the shaker motor and solenoid of each filtering unit to complete said circuits in a manner to operate the shaker motor only when the solenoid is operated to disconnect the unit from the common exhaust manifold, means controlling operation of the switch means of the several filtering units in a predetermined sequence, and means to vary the frequency of operation of the last named means.

8. In an apparatus for separating entrained material from air including a plurality of filtering units having filters therein supported for shaking movement, the units being connected at one end to a common source of air to be filtered and at the other end to a common exhaust manifold, the improvement in means for periodically cleaning the filters of the several units which comprises a valve for each filtering unit to selectively disconnect the unit from the common manifold, a solenoid for each valve controlling the operation thereof, a second valve for each unit to connect the unit to atmosphere, means responsive to movement of the solenoid operated valve to its closed position to open the second valve, filter shaking means for each filtering unit including a motor, switch means in the power circuits of the shaker motor and the solenoid of each filtering unit to complete said circuits in a manner to operate the shaker motor only when the solenoid is operated to disconnect the unit from the common exhaust manifold, means controlling the period of operation of the switch, and means controlling the frequency of the periods.

9. In an apparatus for separating entrained material from air including a plurality of filtering units having filters therein supported for shaking movement, the units being connected at one end to a common source of air to be filtered and at the other end to a common exhaust manifold, the improvement in means for periodically cleaning the filters of the several units which comprises a valve for each filtering unit to selectively disconnect the unit from the common manifold, a solenoid for each valve controlling the operation thereof, a second valve for each unit to connect the unit to atmosphere, means responsive to movement of the solenoid operated valve to its closed position to open the second valve, filter shaking means for each filtering unit including a motor, switch means in the power circuits of the shaker motor and solenoid of each filtering unit to complete said circuits in a manner to operate the shaker motor only when the solenoid is operated to disconnect the unit from the common exhaust manifold, means for controlling the period of operation of the switch means, means for controlling the frequency of the period and means for varying the period for any desired frequency.

10. In an apparatus for separating entrained material from air including a plurality of filtering units having filters therein supported for shaking movement, the units being connected at one end to a common source of air to be filtered and at the other end to a common exhaust manifold, the improvement in means for periodically cleaning the filters of the several units which comprises a valve for each filtering unit to selectively disconnect the unit from the common manifold, a solenoid for each valve controlling the operation thereof, a second valve for each unit to connect the unit to atmosphere, means responsive to movement of the solenoid operated valve to its closed position to open the second valve, filter shaking means for each filtering unit including a motor, magnetically operated switch means in the power circuits of the shaker motor and solenoid of each filtering unit to complete said circuits in a manner to operate the shaker motor only when the solenoid is operated to disconnect the unit from the common exhaust manifold, a magnetic starter for the shaker motor of each filtering unit, a switch in the power circuits of each magnetic starter, a pair of rotatable discs having peripheral cutout portions controlling operation of the last named switch, means for varying the speed of rotation of the discs, and means to vary the peripheral lengths of the cutout portions.

PHILIP R. HORNBROOK.